United States Patent [19]
Hayes

[11] Patent Number: 4,643,873
[45] Date of Patent: Feb. 17, 1987

[54] FABRICATION OF NUCLEAR FUEL PELLETS

[75] Inventor: Michael R. Hayes, Preston, England

[73] Assignee: United Kingdom Atomic Energy Authority, England

[21] Appl. No.: 705,137

[22] Filed: Feb. 25, 1985

[30] Foreign Application Priority Data

Mar. 9, 1984 [GB] United Kingdom ............. 8406208

[51] Int. Cl.$^4$ ............................................. B22F 1/00
[52] U.S. Cl. ................................. 419/33; 419/36; 419/37; 419/38; 419/42; 252/643; 423/253; 423/260; 423/261
[58] Field of Search ............... 264/0.5; 419/38, 42; 252/643; 423/253, 260, 261

[56] References Cited

U.S. PATENT DOCUMENTS

| | | | |
|---|---|---|---|
| 3,371,133 | 2/1968 | Nishijima | 264/0.5 |
| 4,397,824 | 8/1983 | Butler et al. | 423/261 X |
| 4,436,677 | 3/1984 | Radford et al. | 419/42 X |

FOREIGN PATENT DOCUMENTS

| | | |
|---|---|---|
| 0076680 | 4/1983 | European Pat. Off. |
| 1542344 | 6/1970 | Fed. Rep. of Germany . |
| 1592468 | 12/1970 | Fed. Rep. of Germany . |
| 1219022 | 5/1960 | France . |
| 910700 | 11/1962 | United Kingdom . |
| 1116663 | 6/1968 | United Kingdom . |
| 1155969 | 6/1969 | United Kingdom . |

OTHER PUBLICATIONS

Journal of Nuclear Materials, vol. 106, No. $\frac{1}{2}$, Apr. 1982, pp. 15–33.
Search report of FR 85 03467.

Primary Examiner—Stephen J. Lechert, Jr.
Attorney, Agent, or Firm—Larson and Taylor

[57] ABSTRACT

Uranium dioxide powder produced by a gas phase process in which uranium hexafluoride is reacted with dry steam and then with steam and/or hydrogen at a higher temperature is subjected to mechanical treatment, e.g. milling, to break down its structure and increase its packing density. Other powders may be included with the uranium dioxide. The treated powder is mixed with a limited quantity (e.g. 0.5% by weight) of binder, preferably a high strength adhesive, to produce a free flowing powder and formed into pellets by pressing. The pellets are then sintered. Optionally the free flowing powder is spheroidised by tumbling prior to pressing into pellets.

9 Claims, No Drawings

FABRICATION OF NUCLEAR FUEL PELLETS

This invention relates to the fabrication of nuclear fuel pellets, particularly pellets comprising uranium dioxide.

The structure of particles of uranium dioxide powder varies according to the route used to prepare the powder and this structure has a direct bearing on the ease with which the powder can be pressed to form green bodies of sufficient integrity and strength to withstand subsequent handling operations without damage prior to final sintering. The structure of uranium dioxide powder produced on a large scale by gas phase processes in which uranium hexafluoride is reacted with dry steam and then with steam and/or hydrogen at a higher temperature can produce uranium dioxide which is valued for its uniformity, its ability to sinter to very high densities and its consistent extreme chemical purity. The resulting powder may be subsequently processed with or without the addition of an organic binder. In the binderless route, the oxide powder obtained from the gas phase reaction is pre-pressed to form briquettes which are then fractured, sieved and conditioned to produce $UO_2$ granules for subsequent pelleting and sintering operations. The green pellets formed in the binderless route are of somewhat lower integrity and strength but have the advantage that they do not require treatment to dispose of binder.

Where an organic binder (e.g. polymethylmethacrylate as sold, for instance, under the proprietary name Cranko) is combined with the powder produced by the gas phase reaction, it has been generally found necessary to employ it in a quantity of at least 2% by weight to enable green pellets of high integrity and strength to be obtained. With such large quantities of binder present, a preliminary furnace treatment of the green pellets is necessary to substantially eliminate the binder prior to final sintering.

It has been recognised, for example in British Pat. No. 1545747, that the incorporation of lesser amounts of binder may obviate the need for a separate furnace treatment for elimination of the binder. In the said Patent, it is suggested that improved green pellet integrity can be achieved (when compared with green pellets produced by the binderless route) with binder quantities less than 1% by weight.

According to the present invention uranium dioxide powder produced by a gas phase process in which uranium hexafluoride is reacted with dry steam and then with steam and/or hydrogen at a higher temperature is subjected to intense mechanical attrition to increase its packing density, the treated powder is mixed with a limited quantity of binder to produce free flowing particles which, following optional spheroidising by tumbling, are formed into pellets comprising uranium dioxide, and finally the pellets are sintered.

The structure of the particles in the initial uranium dioxide powder derived from the gas phase reaction have been observed to comprise a three-dimensional lattice of linked primary crystallites. When this powder is pressed, the particles interlock increasingly as the pressing pressure increases and then begin to collapse as the pressure is increased further. The integrity of a pressed body, therefore, improves initially as the pressing pressure increases, then starts to deteriorate and relatively large amounts of binder (that is, more than 2% by weight) are generally required to improve the integrity of a pressed body significantly. By intense mechanical attrition of the powder prior to pressing by, for example, ball milling, the three dimensional lattice of the particles is broken down into smaller units with a reduced potential for interlocking together such that, if this powder is pressed directly into pellets the pellets have low integrity. The small units produced by milling do, however, pack together closer than the original particles of uranium dioxide powder. Thereby an increased number of points of contact are provided, to the extent that much smaller amounts of binder are effective in improving the integrity and strength of pressed bodies, for example, less than 0.5% by weight of dry binder to the weight of powder in the pressed body. A furnace treatment to remove the binder subsequently may not be necessary.

Thus, in contrast with the proposals disclosed in Pat. No. 1545747, the method of the present invention involves intense mechanical attrition to increase powder packing density so that the limited quantity of binder is more effective by virtue of the substantial increase in points of contact and hence particle-particle interfacial sites available for the binder. Although British Pat. No. 1545747 refers to fluidising the $UO_2$ powder as such or as granules following preliminary pre-compaction and crushing of the compact, these processes (i.e. fluidising, compaction and crushing) do not result in any significant structural alteration of the powder particles. It is only after the particle structure has been radically altered that a large improvement in green pellet integrity is attainable with the limited quantities of binder contemplated in British Pat. No. 1545747 and the present invention.

The mechanical attrition step, for example by ball milling, preferably involves the complete breaking down of the three dimensional lattice of the powder particles into individual crystallites. The degree of mechanical attrition necessary to achieve this may be ascertained for a particular powder by subjecting a portion of the powder to mechanical attrition for successive time intervals and measuring the rise in, for example, the tap density of the powder which takes place during each interval. The required degree of mechanical attrition is then that beyond which no further significan rise in tap density occurs.

In the method of the invention, it is also an advantage that after binder addition the milled powder spheroidises very readily by tumbling to give a very free flowing, largely spherical, product with a diameter typically of 0.1–0.3 mm which is homogeneous and forms a very suitable press feed material.

Because the spheroidised product is of high density and packing fraction the pressed green pellets have a considerably higher density with a reduced punch travel during pressing. This results in a pressed pellet of more constant density throughout, which subsequently sinters to give a pellet of substantially constant diameter. Accordingly it may be possible to reduce, or even eliminate, diameter grinding to size of sintered fuel pellets.

The binder is preferably an adhesive of high tensile strength and peel resistance and of the type in which rubber, natural or synthetic, is blended with a synthetic resin. Such a binder is practicable because the integrity of a pressed pellet in accordance with the invention is derived from particle to particle bonding rather than by an interlocking mechanism and the integrity and strength increases with that of the bonding agent. Additionally, this type of bond does not deteriorate with increased pressing pressure so that the pressing pressure range for the formation of pellets of high integrity is increased.

The adhesive binder may be diluted in a suitable solvent, for example, that in which it is normally supplied commercially, and added, together with any pore-forming additive, to the mechanically treated powder, to form a slurry which is then dried with continuous stirring to give a dry, non-sticky, granular product for pressing. The use of a die lubricant may be avoided if more than the minimum quantity of binder is present. It is assumed that, with an adhesive binder which melts at a relatively low temperature, transient melting takes place as a result of friction during the pressing operation so that the binder acts as both an internal lubricant and die lubricant during pressing.

The uranium dioxide powder may be mixed throughout the method of the invention with other uranium oxides and/or with thorium or plutonium oxides, also with additives which act as sintering aids or grain growth promoters.

EXAMPLE

In the preparation of uranium dioxide pellets from a typical uranium dioxide powder produced by the aforesaid gas phase reaction, the characteristics of the starting powder are:

Specific surface area: 2.4 m$^2$/g
Pour density: 1.08 g/cm$^3$
Tap density: 2.05 g/cm$^3$ A charge of 7 kg of the powder is fed into a 12 inch diameter drum containing 37 kg of steel balls. The drum is closed and rotated for a period of 5 hours. The contents of the drum are then sieved to separate the milled uranium dioxide powder which has the following characteristics:

Specific surface area: 3.3 m$^2$/g
Pour density: 2.61 g/cm$^3$
Tap density: 3.95 g/cm$^3$ The milled powder is then stirred into 1.75 liters of trichloroethylene into which 87.5 g of proprietary adhesive Evode No 528 (manufactured and sold by Evode Limited, Stafford, England) has previously been dispersed. The resulting slurry is poured into a shallow tray which is placed in a current of air at ambient temperature until all of the trichloroethylene has evaporated.

The resulting friable biscuit is removed from the tray and brushed gently through a 14 mesh sieve (British standard mesh corresponding to 1200 microns). The resulting granules containing 0.3% by weight of adhesive binder are pressed at 4 te/cm$^2$ to give green pellets of high integrity and strength prior to sintering in a hydrogen atmosphere.

I claim:

1. A method of fabricating nuclear fuel pellets in which uranium dioxide powder in a gas phase process by reacting uranium hexaflouride first with dry steam and then with steam and/or hydrogen at a higher temperature is subjected to intense mechanical attrition to increase its packing density, said intense mechanical attrition being for a time sufficient to break down the stucture of the powder particles into their constituent crystallites, the treated powder is mixed with a limited quantity of binder to produce free flowing particles which are formed into pellets comprising uranium dioxide, and the pellets are sintered.

2. A method as claimed in claim 1 wherein the treated powder mixed with binder is spheroidised by tumbling before forming into pellets.

3. A method as claimed in claim 1 wherein the pellets are formed by pressing without a die lubricant.

4. A method as claimed in claim 1 wherein the uranium dioxide powder is subject to mechanical attrition by milling.

5. A method as claimed in claim 1 wherein the limited quantity of binder is less than 0.5% by weight of dry binder to the weight of powder in the pellets.

6. A method as claimed in claim 1 wherein the binder is a high strength adhesive of the rubber/synthetic resin type.

7. A method as claimed in claim 1 wherein plutonium dioxide is mixed with the initial uranium dioxide powder.

8. A method as claimed in claim 1 in which the pellets are sintered without perfoming any intervening debonding furnace treatment.

9. A method as claimed in claim 1 in which, following attrition, the powder particals are combined with the binder to form a slurry which is then dried and granulated to produce granular particles for pressing into pellets.

* * * * *

UNITED STATES PATENT AND TRADEMARK OFFICE
CERTIFICATE OF CORRECTION

PATENT NO. : 4,643,873

DATED : February 17, 1987

INVENTOR(S) : HAYES, Michael R.

It is certified that error appears in the above-identified patent and that said Letters Patent are hereby corrected as shown below:

Title Page: Item [73] should read as follows:

--[73] Assignee: British Nuclear Fuels plc
Cheshire, England--.

Signed and Sealed this

Fifteenth Day of December, 1987

Attest:

DONALD J. QUIGG

Attesting Officer

Commissioner of Patents and Trademarks